July 14, 1931.     C. M. GOLDINGER     1,814,687
CAR COUPLER OPERATING DEVICE
Filed Jan. 28, 1929

Inventor:
Carl M. Goldinger
Attorney

Patented July 14, 1931

1,814,687

UNITED STATES PATENT OFFICE

CARL M. GOLDINGER, OF TARENTUM, PENNSYLVANIA, ASSIGNOR TO UNION METAL PRODUCTS COMPANY, OF CHICAGO, ILLINOIS, A CORPORATION OF DELAWARE

CAR COUPLER OPERATING DEVICE

Application filed January 28, 1929. Serial No. 335,588.

The invention relates to devices for operating railway car couplers, and more particularly, to the relation between the operating rod of such a device and the connector which connects the operating rod to the car coupler lock lifter.

The invention is an improvement in car coupler operating devices wherein the connector has a vertically slidable, and non-rotative, engagement with an eye of a crank forming part of the operating rod. The upper part of this connector forms a semi-circular open hook projecting toward the outer side of the eye and away from the car so as to permit the coupler to move abnormally forward without binding the connector in the eye of the crank. The extremity of this hook is provided with an enlarged head so that the connector must be threaded into the eye of the crank of the operating rod by inserting the lower portion of the connector through the eye. The lower end of the connector is formed into a helical or spiral shaped open loop for engagement with the eye of the coupler lock lifter. Such a construction is shown in Gilpin Patent No. 1,411,489 of April 4, 1922, and my device is an improvement thereon.

The object of my invention is to so form the connector and the eye of the operating rod that the relation between the two is such that the connector cannot be assembled with the operating rod with the hook projecting in any other position than projecting away from the car, or toward the outside of the eye, because when the connector is assembled in the operating rod with the hook projecting toward the car, a slight forward movement of the coupler causes the extremity of the hook to engage the crank of the operating rod and thereby restrict the forward movement of the coupler. Of course, owing to great force, which causes the coupler to move forward, its movement is not actually restricted but rather the connector or the operating rod is bent or twisted so as to seriously affect their proper operation.

Figure 1:
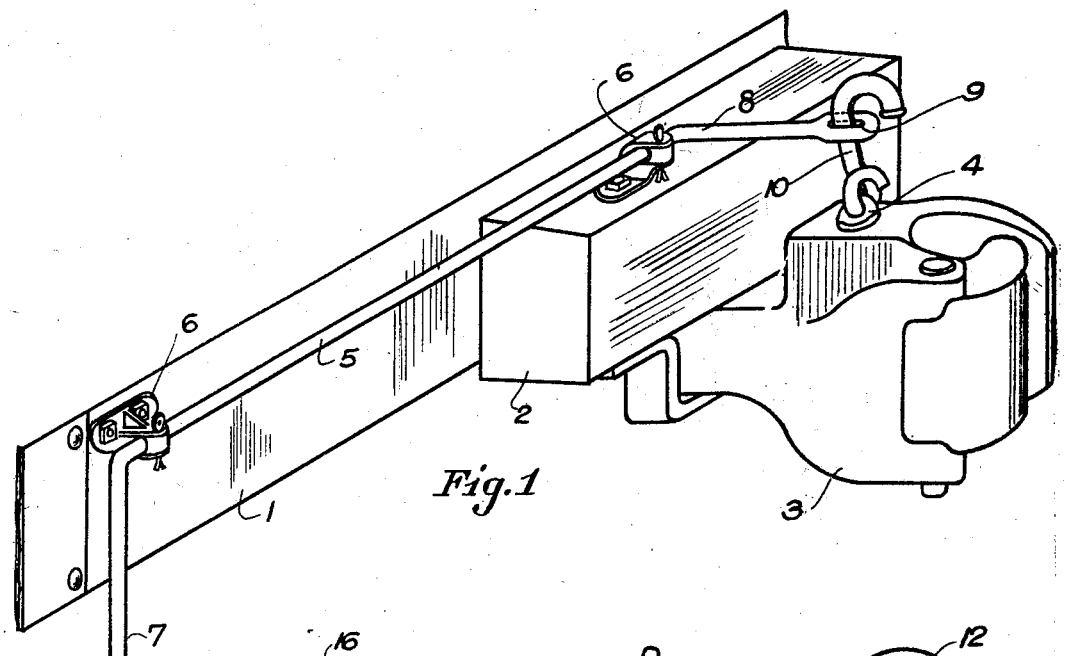
Fig. 1 shows a typical application of my device to a railway car.
Figure 2:
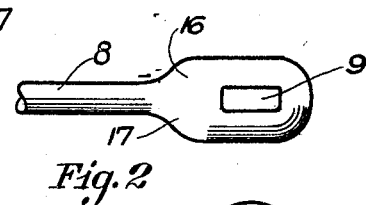
Fig. 2 is an enlarged detail showing the eye in the end of the crank of the operating rod.
Figures 3, 4:
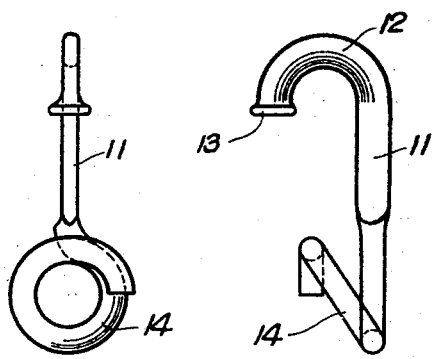
Figs. 3 and 4 show the connector.

In the drawings the usual parts of the car are shown, such as end wall 1; buffing block 2; coupler 3; coupler lock lifter 4; operating rod 5; bracket 6; handle 7; crank 8; crank eye 9 and connector 10. The connector comprises a shank 11 having at its upper end a hook 12 and head 13, and at its lower end a spiral or helical open hook 14, the form and functions of which have been heretofore described. The eye 9 of the crank arm is angular in cross section and the shank 11 of the link is similarly formed to provide slidable but non-rotative movement of the connection 10 therein.

Figure 5:
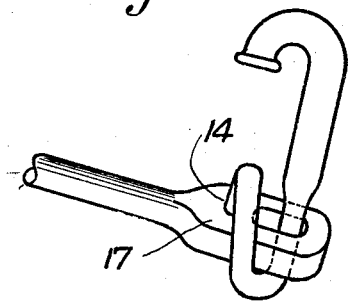
Figs. 5 and 6 show the relation of the connector and the eye of the operating rod in different positions.

In order to assure proper assemblage of the connector with the crank eye I provide the crank with lateral projections 16 and 17 adjacent the rear of the crank eye. In my construction the lower helical loop is positioned on the same side of the shank of the connector as the upper open semi-circular hook. When it is attempted to improperly assemble the connector with the crank eye the end of the spiral hook 14 engages one of the projections 17 on the crank and prevents such assemblage. (See Fig. 5.)

Figure 6:
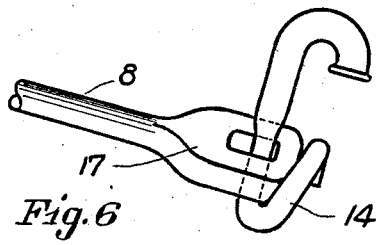

When the helical loop of the connector is properly inserted in the eye of the crank such end clears the outer end of the crank, as shown in Fig. 6, and permits the complete insertion of the connector with the crank eye.

The broad feature of so forming the crank eye and the connector that the connector cannot be improperly inserted in the crank arm eye is disclosed and broadly claimed in an application for patent filed by Charles W. Nicholas of Chicago, Illinois, Serial No. 335,187, filed January 26, 1929, which application is assigned to my assignee and which has matured into Patent 1,746,601, Feb. 11, 1930.

The accompanying drawings illustrate the preferred form of the invention, though it is to be understood that the invention is not limited to the exact details of construction shown and described, as it is obvious that various modifications thereof within the scope of the claim will occur to persons skilled in the art.

I claim:

In an operating device for a railway car coupler, the combination of an operating rod provided with a vertically disposed eye, a connector comprising a substantially vertical shank arranged for slidable and non-rotative movement through said eye, a semi-circular hook at the upper end of said shank having an enlargement at its extremity, and a helical open loop at the lower end of the shank for engagement with an eye of a coupler lock lifter, said loop being positioned on the same side of the shank as the hook, said crank also provided with lateral projections so positioned and proportioned that the connector can only be assembled with the operating rod eye with the upper hook projecting toward the outer side of the eye.

CARL M. GOLDINGER.